United States Patent
Fischer et al.

(10) Patent No.: US 8,368,516 B2
(45) Date of Patent: *Feb. 5, 2013

(54) SECURE DATA EXCHANGE WITH A TRANSPONDER

(75) Inventors: Martin Fischer, Pfedelbach (DE); Ulrich Friedrich, Ellhofen (DE); Jens Masuch, Mannheim (DE); Michael Pangels, Ludwigsburg (DE); Dirk Ziebertz, Eberstadt (DE)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,469

(22) Filed: Jan. 10, 2012

(65) Prior Publication Data

US 2012/0176229 A1   Jul. 12, 2012

Related U.S. Application Data

(63) Continuation of application No. 11/819,132, filed on Jun. 25, 2007, now Pat. No. 8,138,889.

(60) Provisional application No. 60/816,599, filed on Jun. 27, 2006.

(30) Foreign Application Priority Data

Jun. 23, 2006   (DE) .......................... 10 2006 030 767

(51) Int. Cl.
*H04Q 5/22*   (2006.01)

(52) U.S. Cl. ...................... 340/10.1; 340/5.26; 340/5.61; 340/5.2; 380/28; 380/30; 713/168; 713/170

(58) Field of Classification Search .................... 340/10, 340/5.26, 928, 5.2; 380/28, 30; 713/168, 713/170

See application file for complete search history.

(56) References Cited

U.S. PATENT DOCUMENTS

| | | | |
|---|---|---|---|
| 6,130,623 | A | 10/2000 | MacLellan et al. |
| 7,564,345 | B2 | 7/2009 | Devadas et al. |
| 2005/0058292 | A1 | 3/2005 | Diorio et al. |
| 2005/0076197 | A1 | 4/2005 | Struik |

(Continued)

FOREIGN PATENT DOCUMENTS

| | | |
|---|---|---|
| DE | 102005004536 | 11/2005 |
| DE | 102006011685 | 9/2006 |

(Continued)

OTHER PUBLICATIONS

Finkenzeller, Klauz; "Fundamentals and Applications in Contactless Smart Cards and Identification," RFID Handbook, Chapter 8, Data Security, pp. 221-227, 2003.

(Continued)

*Primary Examiner* — Daniel Wu
*Assistant Examiner* — Frederick Ott
(74) *Attorney, Agent, or Firm* — Baker Botts L.L.P.

(57) ABSTRACT

A method includes transmitting, from a base station, a first request and receiving, from a transponder, a first code transmitted responsive to the first request. The method includes transmitting, from the base station, first encoded transmission information comprising a base station code encoded using the first code and a first identification. The base station transmits a second request, and a second code, transmitted by the transponder responsive to receiving the second request and encoded using a base station code extracted from the first encoded transmission information using the first code and the first identification, is received. Second encoded transmission information, including a second identification encoded using the second code, is transmitted from the base station. The second identification information may be extracted using the second code, access to a transponder memory region provided based on comparing the extracted second identification information to a stored version of the second identification.

20 Claims, 1 Drawing Sheet

U.S. PATENT DOCUMENTS

2005/0231369 A1 10/2005 Friedrich et al.
2006/0022799 A1 2/2006 Juels
2006/0208069 A1 9/2006 Gilbert et al.
2006/0214766 A1 9/2006 Ghabra et al.
2007/0008070 A1 1/2007 Friedrich

FOREIGN PATENT DOCUMENTS

DE 102006013504 10/2006
DE 102005032473 A1 1/2007

OTHER PUBLICATIONS

EPCglobal, EPC Radio-Frequency Identity Protocols Class-1 Generation-2 UHF RFID Protocal for Communications at 860 MHz-960 MHz, Version 1.0.9, Jan. 2005.

Duc et al., "Enhancing Security of EPCglobal Gen-2 RFID Tag against Traceability and Cloning," SCIS 2006, Hiroshima, Japan, Jan. 20, 2006.

SECURE DATA EXCHANGE WITH A TRANSPONDER

RELATED APPLICATIONS

This application is a continuation of U.S. application Ser. No. 11/819,132 filed Jun. 25, 2007, which claims priority from U.S. Provisional Application No. 60/816,599 filed Jun. 27, 2006 and claims priority to German Patent Application No. DE 102006030767, filed Jun. 23, 2006.

BACKGROUND OF THE INVENTION

1. Field of the Invention

The present invention relates to a method for secure data exchange between a base station and a transponder, particularly a passive or passive, backscatter-based transponder, whereby an access password of the transponder is subdivided into a first identification and a second identification, which are transmitted successively during transmission of the access password by the base station to the transponder. The invention relates further to a transponder and to a system for secure data exchange.

2. Description of the Background Art

A method for secure data exchange may be implemented in an access control method. Access control methods of this type are used, for example, in contactless identification systems or so-called Radio Frequency Identification (RFID) systems. This type of system typically includes a base station or a reader or a reader unit and a plurality of transponders or remote sensors, which are located simultaneously in the response range of the base station. The transponders or their transmitting and receiving devices typically do not have an active transmitter for data transmission to the base station. Such inactive systems are called passive systems when they do not have their own power supply, and semipassive systems when they have their own power supply. Passive transponders draw the power necessary for their supply from the electromagnetic field emitted by the base station.

Backscatter coupling is employed, as a rule, for data transmission from a transponder to a base station with UHF or microwaves in the far field of the base station. To that end, the base station emits electromagnetic carrier waves, which are modulated and reflected by the transmitting and receiving device of the transponder by means of a modulation method in accordance with the data to be transmitted to the base station. The typical modulation methods for this are amplitude modulation, phase modulation, and amplitude shift keying (ASK) subcarrier modulation, in which the frequency or the phase position of the subcarrier is modified.

An access control method for transponders is described in the draft standard ISO/IEC_CD 18000-6C of 7 Jan. 2005. The transponder in this case is first selected in a selection or arbitration process from a number of transponders. The described selection process is a stochastic process in the form of a slot-based ALOHA protocol. Selection methods of this kind are described in detail, for example, in the handbook by Klaus Finkenzeller, RFID-Handbuch (RFID Handbook), 3rd ed., HANSER, 2002.

The draft standard specifies that access commands and associated routines can be implemented in base stations and/or transponders. The access command in this case is a defined 8-bit sequence. By means of the access command, the base station requests read and/or write access to a password-protected region of the transponder. A base station and a transponder have symmetric (access) passwords for password protection. According to the draft standard, the symmetric access password is a 32-bit password. For read and/or write access to a password-protected transponder and/or a password-protected subregion of the transponder, two access data sequences or access messages are transmitted from the base station to the transponder. The two access data sequences or access messages comprise the access command and a first sub-password or a second sub-password. The first sub-password in this case corresponds to a first half of the symmetric password. The second sub-password corresponds to a second half of the symmetric password.

To prevent a third party from intercepting the access passwords during transmission in the forward link or forward channel, i.e., during transmission from the base station to the transponder, the sub-passwords are each encrypted with a random number. For this purpose, it is provided that the transponder has suitable means for generating a random number and transmits this number upon request to the base station. To increase security, encrypting both sub-passwords with the same random number is to be avoided.

Instead of the access password, a kill password stored in the transponder according to the draft standard can also be transmitted by a similar method. The kill command permanently shuts down (kills) the transponder according to the draft standard.

Symmetric passwords must be made known to all involved companies for access to the transponder. They must also be made known furthermore to companies that set up the transponders. A known approach to close the resulting security gaps is the inclusion of a hash function in the method. In so doing, only a hash value of the first sub-password and/or the second sub-password is stored in the transponder. The transponder has means by which a hash value of a received password can be determined and compared with the stored value.

The base station usually transmits at a high level, so that a listener can listen to the wireless data transmission from the base station to the transponder over great distances, for example, within a radius of a kilometer. Security of the forward channel is therefore especially important. The (sub-) passwords are therefore transmitted encrypted in the forward channel as described above.

Known methods for requesting read and/or write access to a transponder, however, provide no security in the return link or backward channel, i.e., the data transmission from the transponder to the base station.

SUMMARY OF THE INVENTION

It is therefore an object of the present invention to provide a method for secure data exchange between a base station and a transponder for access control, the method having increased security against interception, as well as a transponder and a system with a higher security level at both ends.

According to the invention, in a method for secure data exchange between a base station and a transponder, particularly a passive or passive, backscatter-based transponder, an access password of the transponder is subdivided at least into a first identification and a second identification, which are transmitted successively during a transmission of the access password by the base station to the transponder, and the first identification and the second identification and/or a test value, assigned to the second identification, are stored in a nonvolatile memory of the transponder for password comparison. According to the invention, a first code is provided by the transponder, which is transmitted to the base station upon associated request from said station, a first encoded transmission information comprising the first identification is generated by the base station with use of the first code and transmitted to the transponder, a second code is provided by the transponder, which is transmitted to the base station upon associated request from said station, and a second encoded transmission information comprising the second identification is generated by the base station with use of the second code and transmitted to the transponder. In this case, according to the invention, furthermore, a base station code is generated by the base station. The first encoded transmission information is generated by the base station by encoding the base station code with the first identification and the first random number code. The base station code is extracted by the transponder with acceptance of a correct transmission of the first identification. The second code is encoded with the extracted base station code before transmission to the base station and transmitted encoded to the base station. The second identification is extracted by the transponder from the second encoded transmission information and verified and at least one memory region of the transponder is released for read and/or write access and/or blocked permanently after the second identification has been verified as valid.

The backward channel, i.e., data transmission from the transponder to the base station, can be encoded by the base station code. Because the base station code of the base station is known, the data transmitted encoded by the transponder are decodable by the base station. The base station code is preferably not transmitted as plain text at any time, so that direct interception of the base station code by a third party is not possible at any time.

To make the base station code available to the transponder, it is linked to a first encoded transmission information during use of the first identification and of the first code, provided by the transponder. Here, the first code was previously transmitted as plain text. It could therefore also be intercepted by a listener in close range. Without knowledge of the base station code, however, it is not possible to extract the first identification from the first encoded transmission information. Extraction of the base station code from the first transmission information occurs in the transponder with use of the first identification known to the transponder. If in the case of the base station, this is an attacker who does not know the first identification and who transmits any number as a presumably first encoded transmission information to the transponder, this cannot be determined at this point by the transponder. Regardless of the correctness of the first identification, transmitted encoded, the transponder extracts a presumable base station code from the received data. Verification of the first identification according to the invention thereby does not occur directly but indirectly by extraction and verification of the second identification or additional identifications, whereby a key or code for encoding the second or additional identification(s) depends on the first identification.

As a result, a multistage process is created by which encoding of the data transmission at both ends is possible and which can be easily integrated into a known routine for access control.

In this case, an advantageous embodiment concerns a two-stage process, whereby the first identification and the second identification are transmitted successively. Between transmission of the first identification and the second identification, it is possible for other signals, for example, so-called acknowledge or confirmation signals, to be transmitted. It is conceivable, furthermore, to divide the access password or several access passwords into more than two identifications and to transmit these accordingly in order to increase the security by means of additional steps.

In an embodiment of the invention, a configuration bit in the transponder signals whether the second identification is stored in the transponder as a test value or as plain text. The second identification can be stored in the transponder directly or as a test value, particularly as a hash value. To be able to use a method independently of a memory type of the second identification in the transponder, the memory type of the base station is communicated by a configuration bit, so that an appropriate routine for determining the test value from the transmitted second identification is provided in the method.

In another embodiment, the first code, the second code, and/or the base station code are generated by random numbers. Random numbers offer a basis, simple to implement, for many cryptographic methods. The random numbers, in this case, can be generated by suitable software and/or hardware means.

In a continuation of the invention, for coding, data are linked by a logical operation, particularly an XOR operation. Logical operations can be converted by simple means also in passive, backscatter-based transponders and require only little power.

In another embodiment, the base station code is used as a preload value for a random number series, whereby the read and/or write access to the transponder is encoded by the random number series. Depending on the type of random number series, a repetition can be performed after a certain sequence of random numbers. Suitable selection of the (pseudo-) random number series generator, however, assures that the repetition occurs only after a sufficiently long time.

In a continuation of the invention, the random number series is generated by a linear feedback shift register (LFSR) method. The shift register has a length of n bits and any number of branches. With a suitable selection and/or a number of branches, a maximum period length up to a repetition of the (pseudo-) random number sequence of up to $2^n-1$ is possible. For initialization, the shift register is "loaded" with the base station code, which may be any number not equal to zero.

In another embodiment, the base station is signaled by a signal in a header of a transmission message that the first identification is encoded with the base station code. Typically, data are transmitted in so-called transmission messages, a data sequence being preceded by command bits, identification bits, or other signals. In order to be able to use the method of the invention in many ways, it is conceivable to indicate coding by means of the base station code to other participants of the system, so that a combination is also possible in a system with participants without the additional security.

In a continuation of the invention, the coding is signaled by a set bit in the header. In an embodiment, a new command sequence, for example, a user instruction, is used for this.

In another embodiment of the invention, a transmission of the first encoded transmission information is acknowledged by a handle. The handle can be used as identification for the subsequent communication, as described, for example, in the draft standard.

In a continuation, after receipt of the handle the second code is requested by using the handle.

The object is attained furthermore by a transponder for secure data exchange with a base station, particularly a passive or passive, backscatter-based transponder, whereby at least one first identification and a second identification and/or a test value, assigned to the second identification, are stored in a nonvolatile memory of the transponder and a first and a second code can be provided by the transponder using suitable means. According to the invention, the transponder comprises suitable means, so that a base station code can be extracted by the transponder from a received first encoded transmission information with knowledge of the first identification and of the first code, the second code can be encoded by the base station code for transmission by the transponder, and the second identification can be extracted by means of the second code from a received second encoded transmission information and verified, whereby at least one memory region of the transponder is released for read and/or write access or permanently blocked after the second identification is verified as valid. Encryption of the data transmission in the return link by the transponder is thereby possible.

In an embodiment, the transponder comprises means, so that a test value can be generated by the transponder from the received second identification for comparison with the test value stored in the transponder. Storage of the second identification as plain text in the transponder is thereby not necessary. Manufacturers or installers of the transponder therefore also need not receive information on an access password to the transponder.

In another embodiment, the transponder has means by which a bit can be read from a header of a received signal, and extraction of the base station code can be activated by an associated value of the bit. Hence, the transponder can also communicate with base stations, which have no encryption of the backward channel implemented.

The object is attained further by a system for secure data exchange comprising a base station and a transponder of the invention, whereby a first code can be provided in the transponder, which can be transmitted to the base station upon associated request by said station, a base station code can be generated by the base station, a first encoded transmission information can be generated by the base station from the first identification, the base station code, and the first code and transmitted to the transponder, the base station code can be extracted by the transponder with use of the first identification, a second code can be provided in the transponder, can be encrypted with the base station code, and can be transmitted to the base station, a second encoded transmission information can be generated from the second identification and the second code by the base station and transmitted to the transponder, the second identification can be extracted by the transponder from the second encoded transmission information and verified, and at least one memory region of the transponder is released for read and/or write access or permanently blocked after the second identification is verified as valid.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
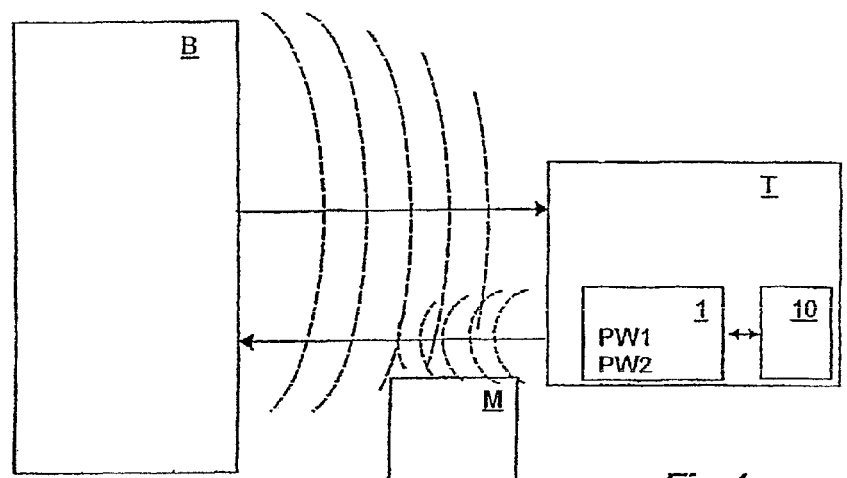
FIG. 1 is a schematic depiction of a system for wireless data transmission.

FIG. 1 shows schematically a system comprising a base station B and a transponder T, which communicate with each other in a wireless manner. The depicted transponder T has a memory region 10, which is protected by an access password. The transponder T may have other memory regions (not shown), which are protected by the same access password or an additional access password or are not password-protected.

The access password is subdivided into a first identification PW1 and a second identification PW2, which are stored in a nonvolatile memory 1 of transponder Z [sic]. To request read and/or write access to memory region 10 of the transponder by base station B, the access password is to be transmitted to transponder T. As schematically shown in FIG. 1, the transmission from the base station to the transponder, i.e., data transmission in a forward channel, occurs at a much higher level than the data transmission in the backward channel, i.e., from transponder T to base station B. With suitable positioning, however, the signal in the backward channel can also be intercepted by a listener M. According to the invention, therefore, relevant data are encoded at both ends.

Figure 2:
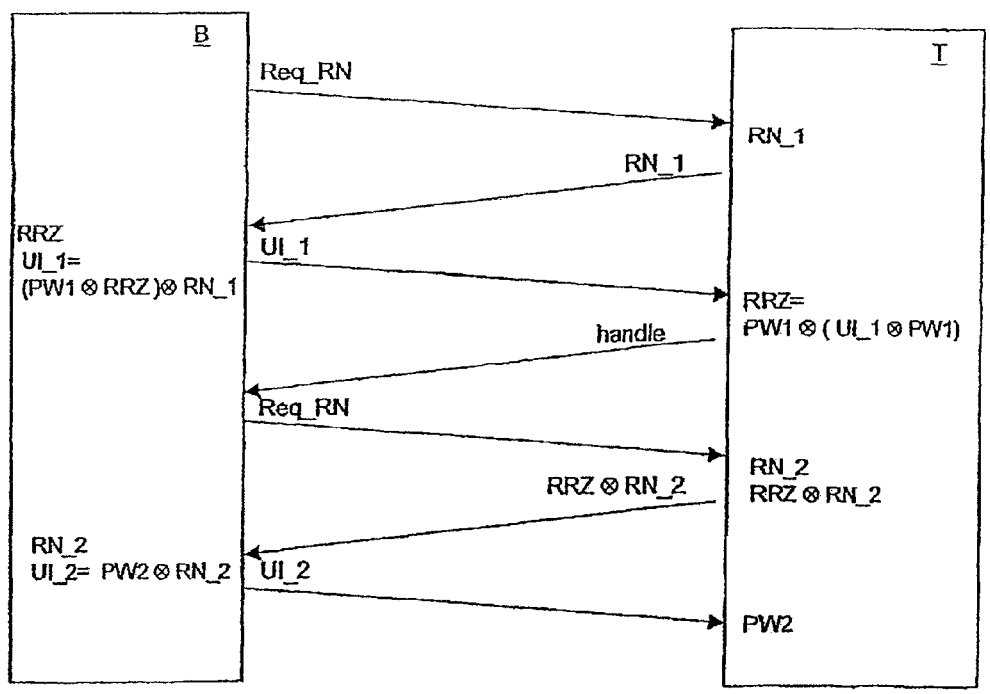
FIG. 2 is a schematic depiction of a method for wireless data transmission with encryption at both ends.

FIG. 2 schematically shows a sequence of the method of the invention for secure data exchange, particularly for the transmission of a password, between a base station and a transponder.

For this purpose, base station B first transmits a request for a code, particularly for a random number. In the depicted embodiment, this is the request Req_RN according to the aforementioned draft standard. In response to the request, transponder T generates a random number RN_1 and transmits it to base station B. Base station B according to the invention generates a base station code RRZ and links it to the first identification PW1. The result is finked with the received random number RN_1 to a first transmission information UI_1. The first encoded transmission information UI_1 is transmitted to transponder T. Transponder T with knowledge of the random number RN_1 and the first identification PW1 extracts the base station code RRZ from the first encoded transmission information UI_1. The receipt of the base station code RRZ is acknowledged by a handle.

Base station B thereupon transmits a second request to transmit a second random number. Transponder T because of the request generates a second random number RN_2 and links it with the extracted base station code RRZ. Base station B extracts the second encrypted random number RN2 from the data transmitted encrypted. Next, base station B generates a second encoded transmission information UI_2 by linking the second identification PW2 with the second random number RN2. The second encoded transmission information UI_2 is transmitted to transponder T. The transponder extracts the second identification PW2 from the second encoded transmission information UI_2. The extracted identification PW2 can then be compared directly with the second identification stored in the transponder. In another embodiment, a test value of the extracted second identification PW2 is formed for the comparison.

Except for the first random number RN1, in this case, information is not transmitted as plain text at any time. For a listener, the subsequently transmitted data are therefore not apparent as plain text. Based on the first random number, the first identification PW1 cannot be extracted from the encoded transmission information UI_1 by the listener without knowledge of the base station code RRZ. The security of the data transmission can be considerably improved in this way.

The transmitted base station code RRZ is preferably a random number. The base station code RRZ is a secret, exchanged between base station B and transponder T. The base station code RRZ can therefore be used as a basis for a subsequent encryption of a data transmission. In an embodiment, the base station code RRZ is used as a preload value for a random number generator. Secure encryption of the data transmission is thus possible by the random number sequence, which is known to transponder T and base station B.

The method can be used, for example, for an RFID system, whereby transponders are assigned to bank cards, credit cards, or similar products. It is apparent here that stored data and the associated account information, etc., are not to be accessible for any "reader" or base stations. The data are therefore protected by an access password. Secure transmission of the access password is possible in several steps, particularly in two steps as shown, by the method of the invention, without an unauthorized listener being able to intercept the access password and/or parts thereof and thus even obtaining access to security-relevant data.

Upon loss of the card, it is desirable to permanently block the data on the card. For example, the transmission of a so-called kill password is necessary to accomplish this.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method comprising:
   transmitting, from a base station to a transponder, a first request;
   receiving, from the transponder, a first code transmitted by the transponder in response to the transponder receiving the first request from the base station;
   transmitting, from the base station to the transponder, first encoded transmission information comprising a base station code encoded using the first code and a first identification;
   transmitting, from the base station to the transponder, a second request;
   receiving, from the transponder, a second code, the second code transmitted by the transponder in response to the transponder receiving the second request from the base station, the second code encoded by the transponder using a base station code extracted from the first encoded transmission information using the first code and the first identification;
   transmitting, from the base station to the transponder, second encoded transmission information, the second encoded transmission information comprising a second identification encoded by the base station using the second code, the second identification information adapted to be extracted by the transponder from the second encoded transmission information using the second code, access to at least one memory region of the transponder provided based on a comparison of the extracted second identification information to a stored version of the second identification.

2. The method of claim 1, wherein one or more of the first code and the second code are generated using random numbers.

3. The method of claim 1, wherein the encoding of the second code is performed using an XOR operation.

4. The method of claim 1, wherein extracting the base station code further comprises accessing the first identification stored in a memory.

5. The method of claim 1, wherein comparing the extracted second identification comprises accessing the stored version of the second identification stored in a memory.

6. The method of claim 1, further comprising receiving a handle from the transponder, the handle providing an acknowledgement of receipt of the first encoded transmission information by the transponder.

7. The method of claim 6, further comprising transmitting the second request after receiving the handle.

8. A circuit configured to:
   transmit, from a base station to a transponder, a first request;
   receive, from the transponder, a first code transmitted by the transponder in response to the transponder receiving the first request from the base station;
   transmit, from the base station to the transponder, first encoded transmission information comprising a base station code encoded using the first code and a first identification;
   transmit, from the base station to the transponder, a second request;
   receive, from the transponder, a second code, the second code transmitted by the transponder in response to the transponder receiving the second request from the base station, the second code encoded by the transponder using a base station code extracted from the first encoded transmission information using the first code and the first identification;
   transmit, from the base station to the transponder, second encoded transmission information, the second encoded transmission information comprising a second identification encoded by the base station using the second code, the second identification information adapted to be extracted by the transponder from the second encoded transmission information using the second code, access to at least one memory region of the transponder provided based on a comparison of the extracted second identification information to a stored version of the second identification.

9. The circuit of claim 8, wherein one or more of the first code and the second code are encoded using random numbers.

10. The circuit of claim 8, wherein the encoding of the second code is performed using an XOR operation.

11. The circuit of claim 8, wherein extracting the base station code further comprises accessing the first identification stored in a memory.

12. The circuit of claim 8, wherein comparing the extracted second identification comprises accessing the stored version of the second identification stored in a memory.

13. The circuit of claim 8, wherein the circuit is further configured to receive a handle from the transponder, the handle providing an acknowledgement of receipt of the first encoded transmission information by the transponder.

14. An apparatus comprising:
   a memory area; and
   one or more computer-readable non-transitory storage media coupled to memory area that embody logic that is configured when executed to:
      transmit, from a base station to a transponder, a first request;

receive, from the transponder, a first code transmitted by the transponder in response to the transponder receiving the first request from the base station;

transmit, from the base station to the transponder, first encoded transmission information comprising a base station code encoded using the first code and a first identification;

transmit, from the base station to the transponder, a second request;

receive, from the transponder, a second code, the second code transmitted by the transponder in response to the transponder receiving the second request from the base station, the second code encoded by the transponder using a base station code extracted from the first encoded transmission information using the first code and the first identification;

transmit, from the base station to the transponder, second encoded transmission information, the second encoded transmission information comprising a second identification encoded by the base station using the second code, the second identification information adapted to be extracted by the transponder from the second encoded transmission information using the second code, access to at least one memory region of the transponder provided based on a comparison of the extracted second identification information to a stored version of the second identification.

15. The apparatus of claim 14, wherein one or more of the first code and the second code are generated using random numbers.

16. The apparatus of claim 14, wherein the encoding of the second code is performed using an XOR operation.

17. The apparatus of claim 14, wherein extracting the base station code further comprises accessing the first identification stored in a memory.

18. The apparatus of claim 14, wherein comparing the extracted second identification information comprises accessing the stored version of the second identification stored in a memory.

19. The apparatus of claim 14, wherein the logic is further configured to receive a handle from the transponder, the handle providing an acknowledgement of receipt of the first encoded information by the transponder.

20. The apparatus of claim 19, wherein the logic is further configured to transmit the second request after receiving the handle.

* * * * *